United States Patent
Lilani

(12) 
(10) Patent No.: US 6,562,741 B1
(45) Date of Patent: May 13, 2003

(54) FIREFIGHTER GARMENT OUTER SHELL FABRIC UTILIZING STOCK DYED MELAMINE FIBER AND RING-SPUN YARN FOR MAKING THE SAME

(75) Inventor: Harish N. Lilani, Lafayette Hill, PA (US)

(73) Assignee: Norfab Corporation, Norristown, PA (US)

( * ) Notice: Subject to any disclaimer, the term of this patent is extended or adjusted under 35 U.S.C. 154(b) by 0 days.

(21) Appl. No.: 09/572,177

(22) Filed: May 17, 2000

(51) Int. Cl.[7] .................. D03D 15/00; B32B 27/12; D06P 3/82

(52) U.S. Cl. ............ 442/301; 8/115.7; 8/529; 8/920; 8/924; 8/925; 428/357; 428/364; 428/365; 428/377; 428/920; 428/921; 442/79; 442/85; 442/86; 442/131; 442/136; 442/164; 442/169; 442/189; 442/190; 442/191; 442/199; 442/203

(58) Field of Search ............... 428/357, 364, 428/365, 368, 377, 920, 921; 442/79, 85, 86, 131, 136, 164, 169, 181, 189, 190, 191, 199, 203, 201; 8/115.7, 529, 920, 924, 925

(56) References Cited

U.S. PATENT DOCUMENTS

| | | | | |
|---|---|---|---|---|
| 3,773,463 A | * | 11/1973 | Cohen et al. | 252/8.61 |
| 4,525,168 A | * | 6/1985 | Kelly | 8/130.1 |
| 4,758,465 A | * | 7/1988 | McKinney et al. | 427/393.3 |
| 5,496,625 A | | 3/1996 | Lilani | 428/229 |
| 5,506,043 A | * | 4/1996 | Lilani | 428/377 |
| 5,539,928 A | | 7/1996 | Aldridge | 2/93 |
| 5,819,316 A | | 10/1998 | Aldridge | 2/81 |
| 5,858,888 A | | 1/1999 | Underwood et al. | 442/286 |
| 6,200,355 B1 | * | 3/2001 | Gadoury | 8/529 |

OTHER PUBLICATIONS

Advertisement for Duralite outer shell fabric having heat resistance fibers; no date given.
Advertisement for Southern Mills' outer shell garment fabric; no date given.
Advertisement for PBI Gold + fabric; no date given.
Advertisement for Hoechst Celanese PBI gold fabric; 1996.
Advertisement for BASF Basofil heat & flame resistant fiber; 2000.
NFPA 1971 Standard On Protective Ensemble for Structural Fire Fighting; 1997 Edition.

* cited by examiner

Primary Examiner—Elizabeth M. Cole
Assistant Examiner—Ula C. Ruddock
(74) Attorney, Agent, or Firm—Wolpe and Koenig, P.C.

(57) ABSTRACT

A firefighter garment including melamine high-heat and flame resistant fibers that have been stock dyed to obtain a desired shade or color. The stock dyed fiber is preferably blended with another fiber and the blend spun, by ring or core spinning, into a yarn for use in a protective fabric. Fabric produced by employing a blend of stock dyed melamine fibers and other high temperature fibers offers numerous cost and performance advantages. The elimination of the damage associated with the piece dyeing process allows the fabric to increase its strength and tear characteristics without affecting its thermal performance.

19 Claims, 1 Drawing Sheet

FIREFIGHTER GARMENT OUTER SHELL FABRIC UTILIZING STOCK DYED MELAMINE FIBER AND RING-SPUN YARN FOR MAKING THE SAME

BACKGROUND

Fire fighting turnout garment generally consists of three separate layers. Each layer is designed for a specific function related to firefighter safety and comfort. The outer most layer is commonly known as the outer shell. The outer shell, generally a fabric having high flame and tear resistance qualities, is coated for water resistance and increased wear life. The middle layer is generally a breathable fabric known as a moisture barrier. Generally, the moisture barrier layer is a breathable membrane applied to a suitable substrate fabric to achieve a durable and washable moisture barrier layer. The breathable membrane allows moisture to pass from an inner liner fabric. This allows the garment to breathe during fire fighting operations. The inner most layer or thermal liner fabric is generally made with light weight, bulky fabrics to provide thermal insulation from convective and conductive heat. Many thermal liner fabrics also readily absorb moisture from street garments or station uniforms. This three-layer ensemble is typically made to at least the quality standards specified under the NFPA 1971 Standard on Protective Ensemble for Structural Fire Fighting, 1997 Edition.

Generally, outer shell fabrics are made from high-heat and flame resistant fibers such as Basofil® (melamine), Nomex® (meta-aramid), Kevlar® (para-aramid), P-84™ (copolyimide), PBI® (polybenzimiazole), PBO (poly-p-phenylenebenzobisoxazole), Carbon and Technora® (para-aramid) and Kynol™ (phenol) or a blend thereof. One commonly used fabric is made from a blend of 40% PBI® (polybenzimidazole) fibers and 60% Kevlar® (para-aramid) fibers. PBI® (polybenzimidazole) fiber is used for its resistance to high heat and flame and para-aramid fiber is used for its high strength and wear resistance properties. Generally, the outer shell fabrics are produced from staple fibers made into ring-spun yarns, however, it is also known to use certain filament yarns. Most outer shell fabrics range in weight from 7 to 8 oz./yd$^2$ and are made from ring-spun yarns in a cotton count ranging from 14/2 to 22/2. The fabrics are typically woven in common weave patterns, such as plain or twill, and include a rip-stop weave in the pattern. The rip-stop weave provides tear resistance and still provides suitable tensile properties.

Outer shell fabrics made from a blend of 40% PBI® (polybenzimidazole) and 60% para-aramid yield a tan-caramel shade because PBI® (polybenzimidazole) fiber is naturally dark brown and para-ararnid is naturally lemon yellow. These fabrics have been known for high flame and thermal resistance values, and are also very forgiving of dirt and grease accumulated during use. This recognizable shading and performance in fire service use have made this type and color of fabric almost universally accepted. These types of fabrics are commercially available from Southern Mills of Atlanta Ga., DIFCO, Montreal Quebec; and Safety Components Fabric Technologies, Inc., Greenville S.C. Outer shell fabrics made from other fibers, such as 100% meta-aramid fiber and blends of meta-aramid and/or para-aramid fibers, are dyed to this recognizable shade so they have a similar appearance and are quickly recognized as fire fighting garment material. Color aside, each of these other fabrics may offer different thermal protective properties while still meeting the NFPA qualifications.

The dyeing of meta-aramid and/or para-aramid fabrics is a high-temperature, high-pressure dyeing process that requires skillful processing. However, it has been found that the dye bath chemicals and the mechanical agitation of the fabric during the dyeing process considerably weakens it. In general, the process of piece dyeing aramid fabric is very complicated and costly. Also, the dyed fabric shade differs considerably from one lot to the other. Still further, piece dyed fabric frequently yields poor shade consistency from the jet-dyeing process which results in poor quality, and the showing of "rope marks" and "tire tracks" running along the fabric. As these marks are very visible, these fabrics are generally sold as seconds at a much lower value. This loss of goods or inventory reduction increases the total unit cost of acceptable production. All of the above combine with the loss of fiber from the fabric during dyeing, which can amount to as much as ten percent (10%) of the fabric weight, as motivation to seek a better, more consistent dye process and end product.

It is possible to dye the yarn prior to weaving. However, fabrics produced using this technique are very costly and also involve the same dyeing problems. In addition to dye machine capacity, which often means that yarn dyeing is done in small batches, the nature of the process and the greater loss of fiber from the yarn, which can approach twenty-five percent (25%), cause yarn dyed costs to be much higher than the cost of piece dyeing. This results in higher costs per pound of finished product.

Solution dyed fibers are also available, however, this method is of limited value as most fiber producers offer very little selection in colors. Because solution dyed fibers are commonly at least twice as expensive as natural fibers, this option is rarely used.

The last theoretical option is to stock dye the fiber. However, due to the high-temperature requirements for stock dyeing equipment and the color shade quality of the dyed aramid fiber, this technique is not preferred.

As a result of the above, the majority of the commercial outer shell fabrics are piece dyed using a high-pressure jet-dyeing machine. With the introduction of Basofil® (melamine) fiber into the fire service industry, efforts have been made to piece dye a blended melamine/para-aramid fabric using the conventional piece dyeing technique. However, this process requires close monitoring because the melamine fiber has a tendency to separate during the process. Attempts to dye ring-spun yarn made from forty percent (40%) melamine and sixty percent (60%) para-aramid fibers resulted in poor quality in the dyed yarn. There was also a weight loss of melamine fiber which amounted to almost thirty percent (30%) during the yarn dyeing process. These problems of poor dye quality and fiber loss argued against stock dyeing of high temperature fibers. However, the inventor's prior success in using melamine fibers in protective applications, see U.S. Pat. No. 5,496,625 which uses natural fibers, lead to further investigation of using stock dyeing of the melamine fiber prior to blending with a companion fiber to produce outer shell fabrics. The resulting yarn and fabric quality and improved loss control with the stock dyed aramid fiber was surprising in light of the known problem. Recently, it was learned that solution dyeing of melamine makes the fiber brittle, which when spun into a yarn results in greater fiber lost, unacceptable product and increased cost.

As a result of experimental work, a dark brown or chocolate colored stock dyed melamine fiber was produced. Using forty percent (40%) of this chocolate color melamine fiber and sixty percent (60%) of naturally yellow para-aramid fiber, a ring-spun yarn having a tan to caramel color was produced. Using this yarn for the weaving of an outer shell fabric produced an on loom fabric of the desired color and eliminated the need for a piece dyeing process.

SUMMARY

A textile yarn suitable for use in protective garment fabric. The yarn is formed from stock dyed melanine blended with fibers selected from the group consisting of aramid fibers, phenolic fibers, flame retardant cellulosic fibers, polybenimldazole fibers, and partly or filly oxidized PAN (polyacrylonitrile) fibers.

DETAILED DESCRIPTION OF THE PREFERRED EMBODIMENT

Figure 1:
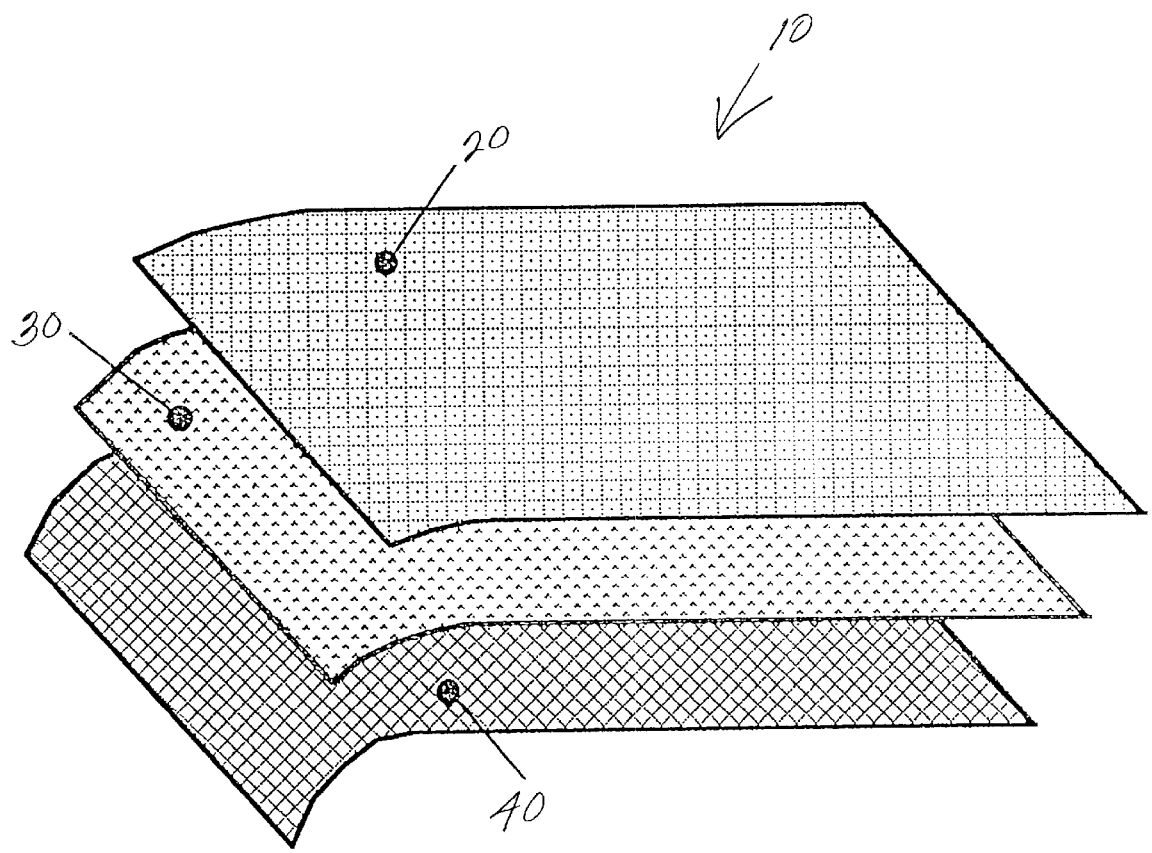
FIG. 1 illustrates the common construction of an outer garment fabric layer which will benefit from the present invention.

As noted previously, fire fighting turnout garments generally consists of three separate layers as illustrated in FIG. 1. Each layer of the garment fabric 10, is designed for a specific function related to firefighter safety and comfort. The outer most layer 20 is commonly known as the outer shell. The outer shell, generally a fabric having high flame and tear resistance qualities, is coated for water resistance and increased wear life. The middle layer 30 is generally a breathable fabric known as a moisture barrier. Generally, the moisture barrier layer is a breathable membrane applied to a suitable substrate fabric to achieve a durable and washable moisture barrier layer. The breathable membrane allows moisture to pass from an inner liner fabric. This allows the garment to breathe during fire fighting operations. The inner most layer or thermal liner fabric 40 is generally made with light weight, bulky fabrics to provide thermal insulation from convective and conductive heat. Many thermal liner fabrics also readily absorb moisture from street garments or station uniforms. This three-layer ensemble 10 is typically made to at least the quality standards specified under the NFPA 1971 Standard on Protective Ensemble for Structural Fire Fighting, 1997 Edition.

Any fire protective garment must meet certain specified standards. An outer shell fabric for firefighter garments has to have many characteristics, such as heat and flame resistance, water repellency and wash fastness while preserving the expected aesthetics and meeting the NFPA standard. Attempts have been made to improve performance characteristics and maintain aesthetics through known techniques for fiber blending, fabric structure, dyeing and finishing. A number of commercially available outer shell fabrics are made from one-hundred percent (100%) meta-aramid fibers or fiber blends, such as, 40% meta-aramid/ 60% para-aramid, forty percent 40% PBI® (polybenzimidazole)/60% para-aramid, 40% melamine/60% para-aramid, and 40% P-84™ (copolyde)/60% para-aramid fibers Generally, these fabrics are produced from ring-spun yarns in a cotton count rangig from 14/2 to 22/2 and the fabrics ranging in weight from 7 to 8 oz/yd$^2$, with an average being about 7.6 oz/yd$^2$. A rip-stop weave is commonly used to increase the fabric's tear resistance. As noted previously, most of these fabrics are piece dyed using the jet-dyeing process to obtain various shades of fabrics, primarily in dark yellow, tan, khaki, black, navy blue, orange and maroon colors. The piece dyed fabric is then generally coated with a suitable fluorocarbon based water repellent to obtain a desired level of water absorption and repellency. All of this is done to comply with and meet the NFPA standards The compliance standards are strictly adhered to throughout the industry and are monitored by independent laboratories such as Underwriters' Lab. Inc. One of the most important and critical performance requirements for any compliant garment ensemble is that it offers a minimium of thermal protective performance (TPP) value or index of 35. Generally, the higher the TPP index the longer the ensemble will protect the firefighter in a "flash-over" situation. The TPP index is tested in the laboratory using a NFPA standard Since the NFPA standard reques a minimum 35 TPP for an ensemble using a moisture barrier fabric and a thermal liner, a TPP study was conducted by an independent laboratory to compare four commercially available outer shell fabrics with CROSSTECHE® E-89™ moisture barrier and Aralite™ thermal liner. All four outer shell fabrics were piece dyed using the known jet-dyeing process, and were coated with a suitable water repellent. The test results are presented in the table below:

| TPP INDEX COMPARISON TABLE | | | | |
|---|---|---|---|---|
| Outer Shell Fiber | Commercial Name | Moisture Barrier | Thermal Line | TPP Index |
| 1. 100% Nomex ® | Defender ™ | CROSSTECH ® E-89 ™ | Aralite ™ | 43 |
| 2. 40% PBI ®/60% Kevlar ® | PBI Gold ® | CROSSTECH ® E-89 ™ | Aralite ™ | 40 |
| 3. 40% Nomex ®/60% Kevlar ® | ADVANCE ™ | CROSSTECH ® E-89 ™ | Aralite ™ | 43 |
| 4. 40% Basofil ®/60% Kevlar ® | "OMNI 45" ™ | CROSSTECH ® E-89 ™ | Aralite ™ | 48 |

All fabrics exceeded the minimum value necessary for compliance with the NFPA standard. The highest TPP value was obtained by fabric number 4 which utilized melamine fiber in a blend with aramid fiber. Note that fabric numbers 2 and 3, while blended with the same percentage of para-aramid fiber, resulted in different TPP indexes. Thus, the comparison of fabric numbers 2, 3 and 4 clearly shows the superior performance of the melamine fibers. This supports the current motivation to provide an economical means of using melamine fiber in these applications.

The presently preferred fabric is a blend of 40% stock dyed melamine fiber and 60% aramid fiber by weight. The average weight of the fabric is 7.8 oz./yd.$^2$ when woven with ring-spun yarns of 16/2 cotton count in a plain weave having forty-four (44) ends per inch (EPI) and thirty-four (34) picks per inch (PPI) with every tenth (10) end and eighth (8) pick being a 16/2 cotton count rip-stop yarn. Keeping with standard practice, the woven fabric is treated with a suitable water repellent coating. By first stock dyeing the melamine fiber separately to a dark brown before blending with the natural yellow aramid, the end fabric was very similar to the tan or golden brown color of a piece dyed fabric, and very similar to the natural PBI Gold® (polybenzimidazole) in color and texture. As a result, a fabric of the desired color was produced off the loom without the expense of piece dyeing.

The superior qualities of fabric produced using forty percent (40%) stock dyed melamine and sixty percent (60%) para-aramid fiber are shown in the table below:

| | COMPARISON TABLE | |
|---|---|---|
| | STOCK DYED | PIECE DYED |
| 1. WEIGHT - OZ./SQ. YD. | 7.84 | 7.99 |
| 2. THICKNESS | 27 MILS. | 27 MILS. |
| 3. TEAR STRENGTH TRAPEZOID WARP × FILL | 51 × 45 (AS RECEIVED) 42 × 40 (AFTER 5 HOME WASHES) | 40 × 35 (AS RECEIVED) 35 × 33 (AFTER 5 HOME WASHES) |
| 4. TABER ABRASION 500 GR. H18 WHEEL | | |
| (a.) AS RECEIVED | 400 CYCLES (fabric in tact) | 400 CYCLES (fabric worn through) |
| (b.) AFTER 5 HOME WASHES | 400 CYCLES (fabric in tact) | 400 CYCLES (fabric worn through) |
| 5. TENSILE BRAKING STRENGTH WARP × FILL | 325 × 308 (AS RECEIVED) 293 × 240 (AFTER 5 HOME WASHES) | 299 × 280 (AS RECEIVED) 205 × 195 (AFTER 5 HOME WASHES) |
| 6. % WATER ABSORPTION | 2.9% (AS RECEIVED) 4.0% (AFTER 5 HOME WASHES) | 0.0% (AS RECEIVED) 0.7% (AFTER 5 HOME WASHES) |
| 7. FLAME RESISTANCE #191A-5903 AFTER FLAME, SEC. CHAR LENGTH, INCH. | 0.0 (AS RECEIVED) 0.0 (AFTER 5 HOME WASHES) 0.5" (AS RECEIVED) 0.6" (AFTER 5 HOME WASHES) | 0.0 (AS RECEIVED) 0.0 (AFTER 5 HOME WASHES) 0.7" (AS RECEIVED) 0.8" (AFTER 5 HOME WASHES) |
| 8. % THERMAL SHRINKAGE WARP × FILL | 0.0 × 0.0 (AS RECEIVED) 0.5 × 0.5 (AFTER 5 HOME WASHES) | 0.0 × 0.0 (AS RECEIVED) 0.0 × 0.0 (AFTER 5 HOME WASHES) |
| 9. % CLEANING SHRINKAGE WARP × FILL | 1.8% × 1.8% | 0.6% × 1.2% |

Outer shell fabrics produced with stock dyed melamine fiber yield higher tear and breaking strengths in comparison to fabrics of the same blend that are produced using the conventional piece dyeing method. From the comparative data, it is evident that the stock dyed fabric is superior to the piece dyed fabric and exhibits 1.20 times higher tear and 1.25 times higher breaking strength even after five (5) home washing cycles. In addition, the fabric of the invention also offers much higher abrasion resistance. Fabric produced in accordance with this invention not only shows the desired physical properties, it also exhibits identical or better thermal values than the same type of fabric which has been piece dyed. As a result of this invention, fabrics utilizing stock dyed melamine fiber obtain the desired color shade, perform better and are produced at a lower cost both in dyeing and lost fiber weight.

What is claimed is:

1. A textile material including yarns having thermally resistant melamine fibers stock dyed to a desired shade prior to being incorporated into the yarns.

2. A textile yarn suitable for use in a protective garment, said yarn having thermally resistant melamine fibers that were stock dyed prior to being formed into a yarn.

3. The textile yarn of claim 2 wherein the stock-dyed melamine fibers are blended with fibers selected from the group consisting of aramid fibers, phenolic fibers, flame retardant cellulosic fibers, polybenzimidazole fibers, copolyimide fibers, poly-p-phenyleiaebenzobisoxazole fibers, and partly or fully oxidized polyacrylonitrile fibers.

4. The yarn of claim 2 wherein the yarn is ring-spun.

5. The yarn of claim 2 wherein the yarn is core-spun.

6. A heat and flame resistant textile fabric having yarns comprised of a blend of stock-dyed melamine fiber and other heat and flame resistant fibers.

7. The fabric of claim 6 wherein the other fibers are selected from the group consisting of aramid fibers, phenolic fibers, flame retardant cellulosic fibers, polybenzimidazole fibers, copolyimide fibers, poly-p-phenylenebenzobisoxazole fibers, and partially or fully oxidized polyacrylonitrile fibers.

8. The fabric of claim 7 wherein the fabric is a woven fabric.

9. The fabric of claim 8 wherein the fabric weave includes a rip-stop weave.

10. The fabric of claim 6 wherein the fabric is coated for water resistance.

11. The fabric of claim 6 wherein the fabric is coated for water resistance.

12. The fabric of claim 6 wherein said yarn is a ring-spun yarn.

13. A firefighter's protective garment comprised of yarns having stock dyed melamine fibers.

14. A high heat and flame resistant yarn comprised of at least in part stock-dyed melamine fiber.

15. A textile yarn as defined in claim 14 in which said yarn is made from a blend of stock-dyed melamine fibers and one or more of the fibers selected from the group consisting of aramid fibers, phenolic fibers, flame retardant cellulosic fibers, polybenzimidazole fibers, copolyimide fibers, poly-p-phenylenebenzobisoxazole fibers, and partially or fully oxidized polyacrylonitrile fibers.

16. A yarn as defined in claim 14 in which said yarn is a ring-spun yarn.

17. A yarn as defined in claim 14 in which said yarn is a core-spun yarn with a suitable filament or staple yarn core.

18. A textile yarn for use in a protective garment characterized by including stock dyed melamine fibers in the yarn.

19. A thermally resistant textile material characterized by including yarns formed with stocked dyed melamine fibers.

* * * * *

UNITED STATES PATENT AND TRADEMARK OFFICE
CERTIFICATE OF CORRECTION

PATENT NO. : 6,562,741 B1
DATED : May 13, 2003
INVENTOR(S) : Harish N. Lilani

It is certified that error appears in the above-identified patent and that said Letters Patent is hereby corrected as shown below:

Column 5,
Line 61, delete "poly-p-phenyleiaebenzobisoxazole", and insert therefor -- poly-p-phenylenebenzobisoxazole --.

Column 6,
Line 43, cancel claim 11.
Line 58, after the word "A", and before the word "as", delete "yam", and insert therefor -- yarn --.
Line 58, after the word "said", and before the word "is", delete "yam", and insert therefor -- yarn --.
Line 59, delete "yam", and insert therefor -- yarn --.

Signed and Sealed this

Thirtieth Day of December, 2003

JAMES E. ROGAN
*Director of the United States Patent and Trademark Office*